United States Patent [19]
Pandel

[11] Patent Number: 5,579,053
[45] Date of Patent: Nov. 26, 1996

[54] METHOD FOR RASTER CONVERSION BY INTERPOLATING IN THE DIRECTION OF MINIMUM CHANGE IN BRIGHTNESS VALUE BETWEEN A PAIR OF POINTS IN DIFFERENT RASTER LINES FIXED BY A PERPENDICULAR INTERPOLATION LINE

[75] Inventor: Juergen Pandel, Feldkirchen-Westerham, Germany

[73] Assignee: Siemens Aktiengesellschaft, Munich, Germany

[21] Appl. No.: 387,189

[22] Filed: Feb. 13, 1995

[30] Foreign Application Priority Data

Mar. 3, 1994 [DE] Germany .......................... 44 07 101.9

[51] Int. Cl.$^6$ .................................................. H04N 7/01
[52] U.S. Cl. ............................................ 348/448; 348/458
[58] Field of Search ..................................... 348/458, 448, 348/452; 345/154, 132; H04N 7/01

[56] References Cited

U.S. PATENT DOCUMENTS

| | | | |
|---|---|---|---|
| 4,868,655 | 9/1989 | Choquet et al. | 348/448 |
| 4,985,764 | 1/1991 | Sato | 348/448 |
| 5,019,903 | 5/1991 | Dougall et al. | 348/448 |
| 5,119,193 | 6/1992 | Noji | 398/452 |

FOREIGN PATENT DOCUMENTS

| | | |
|---|---|---|
| 0551036 | 7/1993 | European Pat. Off. . |
| 2231460 | 11/1990 | United Kingdom . |

OTHER PUBLICATIONS

"Motion Adaptive Scan Rate Up–conversion," Haavisto et al., Multidimensional Systems and Signal Processing, vol. 3, No. 2, (May, 1992), pp. 113–130.

"Fixed, Adaptive and Motion Compensated Interpolation of Interlaced TV Pictures," Weston et al., International Broadcasting Convention 1988, IEEE Conference Publication No. 293 (Sep., 1988) pp. 220–223.

"Progressive Scan Conversion Using Edge Information," Doyle et al., Proc. 1989 HDTV Workshop, Turin.

"Motion Compensated Video Processing for Studio Applications," Ernst, Conf. Les Assisesdes Jeunes Chercheurs, Tokyo, Jun. 8–12, 1992.

"A Deinterlacer For IQTV Receivers and Multimedia Applications," Simonetti et al., IEEE Trans. on Consumer Electr., vol. 39, No. 3 (Aug., 1993), pp. 234–240.

*Primary Examiner*—Victor R. Kostak
*Attorney, Agent, or Firm*—Hill, Steadman & Simpson

[57] ABSTRACT

A format conversion is necessary if video picture sequences are to be displayed on computer screens. The conversion is carried out with the aid of a direction dependent interpolation within the moving objects. For this purpose interpolation lines which are rotated with respect to one another are projected through the pixel to be generated and their intersection with adjacently situated lines of pixels in the first pixel raster is determined. The changes in brightness value between the respective intersections of the interpolation lines with the adjacent lines, these intersections being allocated to the individual interpolation directions, are then determined. That interpolation line is selected whose change in brightness value is a minimum compared with the changes in brightness value of adjacently situated interpolation line. The brightness value of the pixel to be generated in then generated by interpolation in the direction of the interpolation line thus determined.

9 Claims, 3 Drawing Sheets

O=EXISTING PIXEL
X=PIXEL TO BE GENERATED

O = EXISTING PIXEL
X = PIXEL TO BE GENERATED

O = EXISTING PIXEL
X = PIXEL TO BE GENERATED

O=EXISTING PIXEL
X=PIXEL TO BE GENERATED

METHOD FOR RASTER CONVERSION BY INTERPOLATING IN THE DIRECTION OF MINIMUM CHANGE IN BRIGHTNESS VALUE BETWEEN A PAIR OF POINTS IN DIFFERENT RASTER LINES FIXED BY A PERPENDICULAR INTERPOLATION LINE

BACKGROUND OF THE INVENTION

1. Field of the Invention

The present invention is directed to a method for undertaking a format conversion of image sequences from a first pixel raster into a second pixel raster.

2. Description of the Prior Art

A multiplicity of picture (image) formats (pixel rasters), which are mostly incompatible with one another, exist for the recording, transmission and reproduction of image sequences. Depending on the application, the recording takes place with varying height/width ratio and with varying local and lateral resolution. In addition, scanning takes place, for example, either using a line interlace method or progressively, line-by-line. Corresponding differences exist during reproduction of the picture.

A central problem is format incompatibility in the linking of the "television world" with the "computer world." With the appearance of multimedia applications, however, it becomes necessary to eliminate this incompatibility and to carry out a picture format conversion from "interlaced TV" at 50 hertz or 60 hertz field frequency into the computer format (progressive mode with image frequencies between 60 and 100 hertz).

This problem has not yet been taken into account, however, in the computer cards currently available commercially. On the contrary, the two fields of a frame are always written into an image memory and the latter is read out sequentially. In stationary areas of the image, this method poses no problems, but in the case of movement within the image, disturbing effects (i.e. comb-like distortion of vertical edges or double contours during horizontal movement, scrambling of a moving object and background during vertical movement, scrambling of finely structured image regions during all movements) occur because of the time displacement of the two fields. This method is not acceptable for high-quality reproduction of video on computer terminals. A further, very simple solution is to supplement the missing lines in each field by vertical interpolation. Although the effects mentioned above are thereby avoided, a loss in the vertical resolution now occurs, i.e., the images are not sharp in the vertical direction in all areas. Even the combination of the two methods by moving-object segmentation still fails to provide a satisfactory result since the impression of lack of sharpness in moving objects is retained.

Solutions to this de-interlacing problem have been suggested in the literature. Relatively simple methods use linear or nonlinear (median) filtering for a positional time interpolation (i.e., P. Haavisto, J. Juhola, and Y. Neuvo, "Motion Adaptive Scan Rate Up-Conversion," Multidimensional System and Signal Processing, Vol. 3, No. 2, pp. 113–130, May 1992; M. Weston and D. M Ackroyd, Fixed Adaptive and Motion Compensated Interpolation of Interlaced TV Pictures in International Broadcasting Convention 1988, IEE Conference Publication No. 293, pp. 220–223, Sept. 1988). A further method is based on a direction-dependent interpolation using edge information (i.e. T. Doyle and M. Looymans, "Progressive Scan Conversion Using Edge Information," Proc. 1989 HDTV-Workshop, Turin). The best results are achieved with movement-compensating methods (i.e., M. Ernst; Motion Compensated Video Processing for Studio Applications) Conf. Les Assists des Jeunes Chercheurs, Tokyo, 8–12 June 1992).

In the last-mentioned methods, any movement of objects occurring in the scene is estimated, and an interpolation is carried out taking into consideration the movement vectors determined in this way. These known methods are, however, extremely computationally intensive and are consequently also expensive to implement in terms of hardware. Specifically, compared with the movement estimation for the moving picture coding, the vectors have to be determined not only block by block but also individually for each pixel. Furthermore, reliability tests have to be carried out so that the vectors also describe the actual movement as accurately as possible.

SUMMARY OF THE INVENTION

It is an object of the present invention to provide a method by which image sequences of a first pixel raster can be converted into a second pixel raster, for example conversion of "interlaced" image sequences into a progressive format ("de-interlacing"). The main application would be the reproduction of video on computer viewing screens in multimedia terminals. The method should be as simple as possible so that as good an image quality as possible is achieved, but an inexpensive hardware implementation is also made possible.

The method may, however, also be applied to television with improved image quality, i.e., as an intermediate step in increasing the picture frequency for the so-called "flicker-free television set" or directly to reproduction in progressive format.

The above objects are achieved in accordance with the principles of the present invention in a method for the format conversion of image sequences present in a first pixel raster into a second pixel raster, in which the brightness values of the pixels in the second pixel raster are generated by interpolation from the pixels in a first line and in a second line of the first pixel raster adjacent the pixel to be generated. This interpolation is undertaken according to the following steps:

A plurality of pairs of points are selected, each pair of points having one point on the first line and one point on the second line, each pair of points being fixed by respective interpolation lines which pass through the pixel to be generated and which are rotated with respect to one another, at least one of said interpolation lines being vertical.

The change in brightness between the pair of points fixed by the vertical interpolation line is determined.

The change in brightness between pairs of points fixed by successive interpolation lines is determined in two directions of rotation until the change in brightness value in the direction of one interpolation line is a minimum compared with the changes in brightness in the direction of the adjacently situated interpolation lines.

The brightness value of the pixel is then generated by interpolating in the direction having the minimum change in brightness value.

The starting point in the method according to the invention is the method explained in T. Doyle and M. Looymans: "Progressive Scan Conversion Using Edge Information." Proc. 1989 HDTV-Workshop, Torino. Therein, a direction-dependent interpolation inside the moving objects is described. In this publication, the edge information is used to determine the direction of interpolation, while, in the case of the invention, a homogeneity criterion is used.

In this connection, the method according to the invention is based on the following observation. Most of the objects present in a scene have a certain homogeneity in relation to the brightness in a local neighborhood. That is to say, because of the shape and the structure of the objects, a direction can be found for which the change in brightness value is minimal. This means that, in that respective direction, the proportion of high local frequencies is minimal. Accordingly, an interpolation in this direction may also result only in a minimum impairment of the resolution of the picture to be generated.

The method according to the invention makes it possible not only to generate pixels in a progressive display in the center of two adjacently situated lines of the interlace format, but also this method may also be used to generate any desired pixels of a second pixel raster, for example in a progressive display, starting from the pixels in a first pixel raster, for example in interlace format. It is consequently possible also to generate picture portions in windows of variable size, that is to say to scale pictures, i.e., to enlarge and reduce them, It is also possible to carry out enlargements of portions.

DESCRIPTION OF THE PREFERRED EMBODIMENTS

Figure 1:
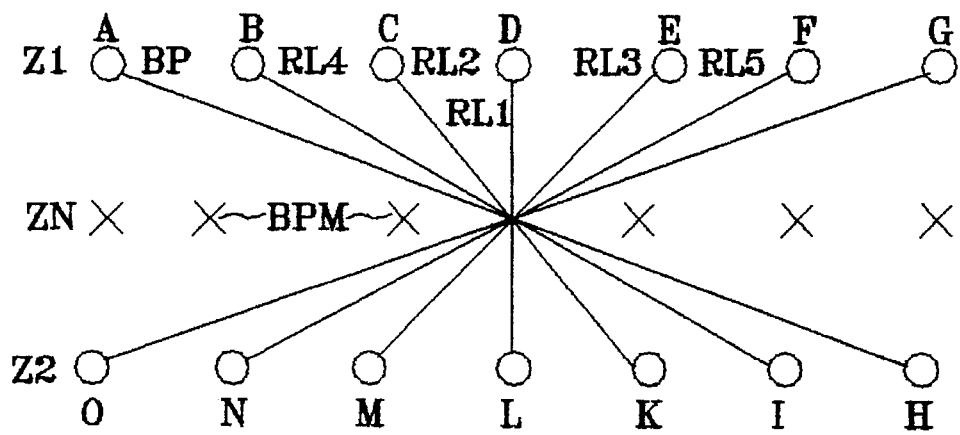
FIG. 1 shows a basic diagram which illustrates how missing pixels can be generated in a progressive display from a frame by direction-dependent interpolation, in a known manner.

FIG. 1 shows a portion of a field, specifically two lines Z1 and Z2, of pixels BP in an interlace format. The pixels BP in the interlace format are denoted by capital letters. From these pixels BP in the interlace format, pixels BPN are to be generated which are shown in FIG. 1 in a line denoted by ZN midway between the lines Z1 and Z2.

In order to generate the pixels BPN, i.e. to determine their brightness value, the environment of the pixel to be generated, denoted by X in FIG. 1, is investigated. In doing this, the starting point in FIG. 1 is a window in the field which has a size of 7×2 pixels. The procedure begins exactly as described in T. Doyle and M. Looymans: "Progressive Scan Conversion Using Edge Information." Proc. 1989 HDTV-Workshop, Turin. Interpolation lines RL are projected through the pixel X to be generated and, in particular, are rotated through a specifiable angle with respect to one another. Said interpolation lines RL pass through the pixel X to be generated and through the pixels BP of the lines Z1 and Z2 in the field in FIG. 1. Each interpolation line thus defines a pair of pixels BP. For example, an interpolation line which is identified by RL 1 is produced in the vertical direction and adjacent interpolation lines are produced which are denoted by RL2 and RL3.

For each interpolation line RL, the change of brightness value between the pixels BP common to that interpolation line is now determined. In doing this, the starting point is the vertical interpolation line RL1 and the change in brightness value which exists between the points D and L is determined. Then the change in brightness value between the pixels C and K, for example, which are fixed by the interpolation line RL2, is then determined. If the change in brightness value between C and K is greater than between D and L, the change in brightness value between the pixels E and M is determined. If this is less than that between the points D and L, the interpolation line RL5 is now employed and the change in brightness value which exists between the pixels F and N is determined. Assuming this change in brightness value is greater than that between the pixels E and M, a minimum in the change in brightness value has been determined and the direction fixed by the interpolation line RL3 is used for the interpolation of the brightness value of pixel X. Starting from the brightness values of the pixel E and the pixel M, the brightness value which the pixel X to be generated should have is therefore determined by a known method.

According to the method of the invention, starting from the vertical line RL1, a minimum in the change in brightness value should therefore be sought in both directions of rotation and once a first minimum of this type has been found, the appropriate interpolation line, i.e., the pixels situated on this line, is selected and, proceeding from its brightness values, the brightness value of the pixel X to be generated is generated by interpolation.

If a possible interpolation direction has been found in this way, the question of whether this direction also reflects an adequately high homogeneity of the brightness is then investigated. This is so if the minimum in the change in brightness value is less than a specifiable threshold, otherwise the vertical interpolation direction is preferred. The interpolation can be achieved by simple averaging, but more expensive symmetrical transversal filters may also be used.

The location of the interpolation direction described in this way provides markedly fewer movement effects than simply determining the minimum location. The reason is that more remotely situated neighboring points are only taken into account in the inventive method if the absolute difference in the changes in brightness value becomes increasingly smaller with rotation from the vertical, in the case of the method disclosed in T. Doyle and M. Looymans; "Progressive scan conversion using edge information". Proc. 1989 HDTV-Workshop, Turin on the other hand, the minimum in the changes in brightness value is determined for all directions of, for example, three interpolation lines or seven interpolation lines, and the interpolation is carried out proceeding from that minimum.

Figure 2:
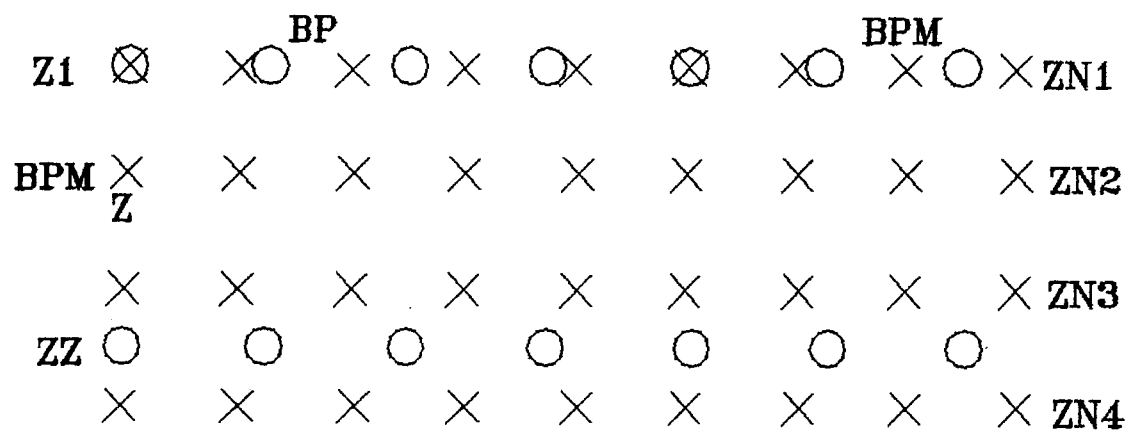
FIG. 2 shows a diagram illustrating the combination of de-interlacing with raster conversion in accordance with the principles of the present invention.

In FIG. 1, the pixels BPN of the line ZN to be generated are situated in the center between the lines Z1 and Z2 of a field. Using the method according to the invention, however, it is also possible to generate a pixel in such a way that portions of the image can be enlarged or reduced. A raster conversion for the local scaling of image sequences and individual images is therefore made possible. The result of the method of the invention is therefore another pixel raster so that, for example, the interlaced/progressive conversion can be linked to a pixel raster conversion. This change in pixel raster can be understood in principle, for example, from FIG. 2. Here, again, two lines Z1 and Z2 in the field format are shown and lines ZN1 to ZN4 containing pixels BPN to be generated are shown in an altered pixel raster. In this diagram, the first line ZN1 is situated within the line Z1, the individual pixels BPN to be generated being displaced with respect to the pixels BP in the field format. Two further lines of pixels BPN to be generated, namely ZN2 and ZN3, are projected between the lines Z1 and Z2 in the field format and, finally, a further line ZN4 of pixels BPN to be generated is also situated on the other side of the line Z2.

Figure 3:
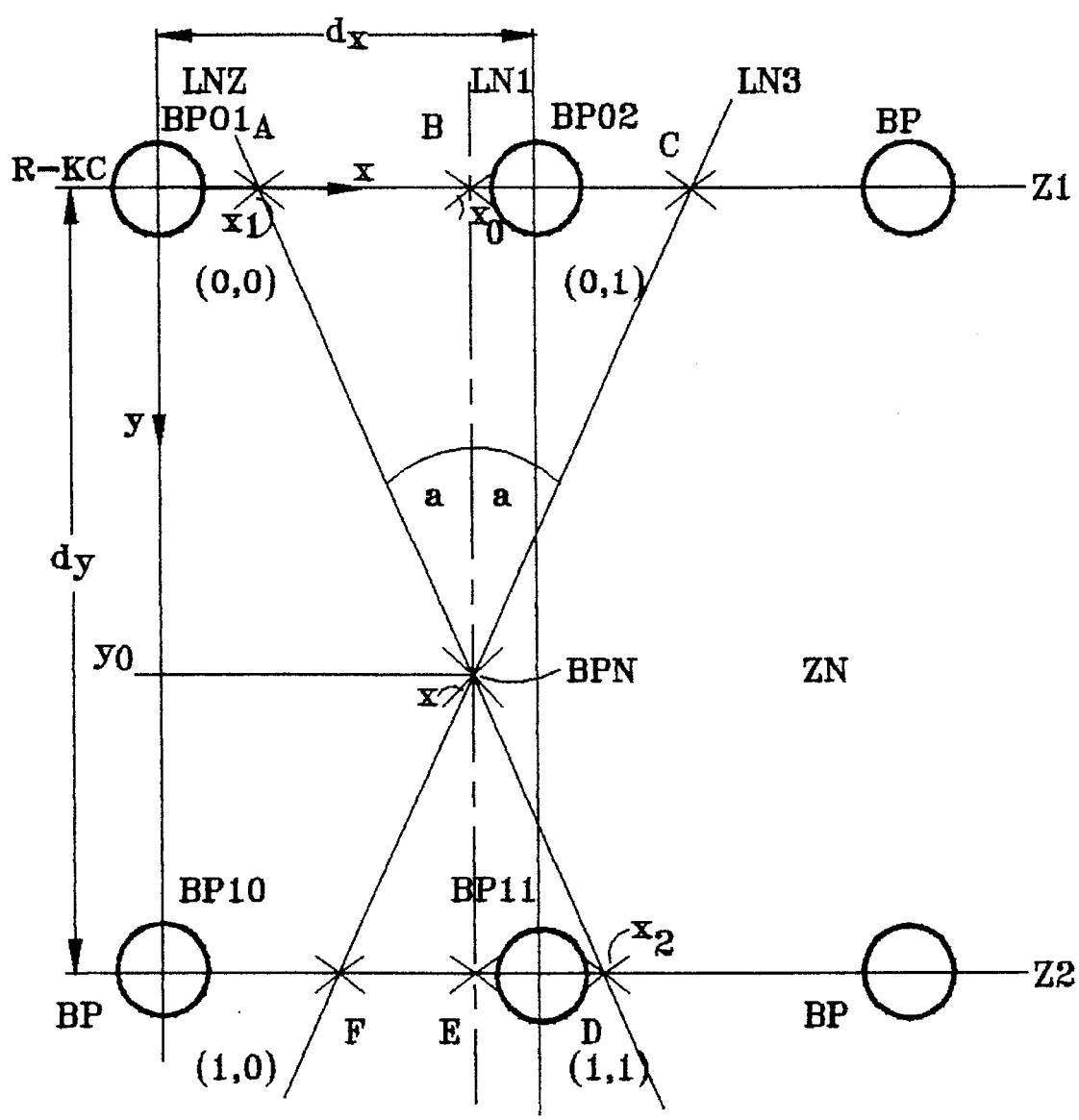
FIG. 3 is a diagram illustrating a method of determining the interpolation direction in a raster conversion in accordance with the principles of the present invention.
Figure 4:
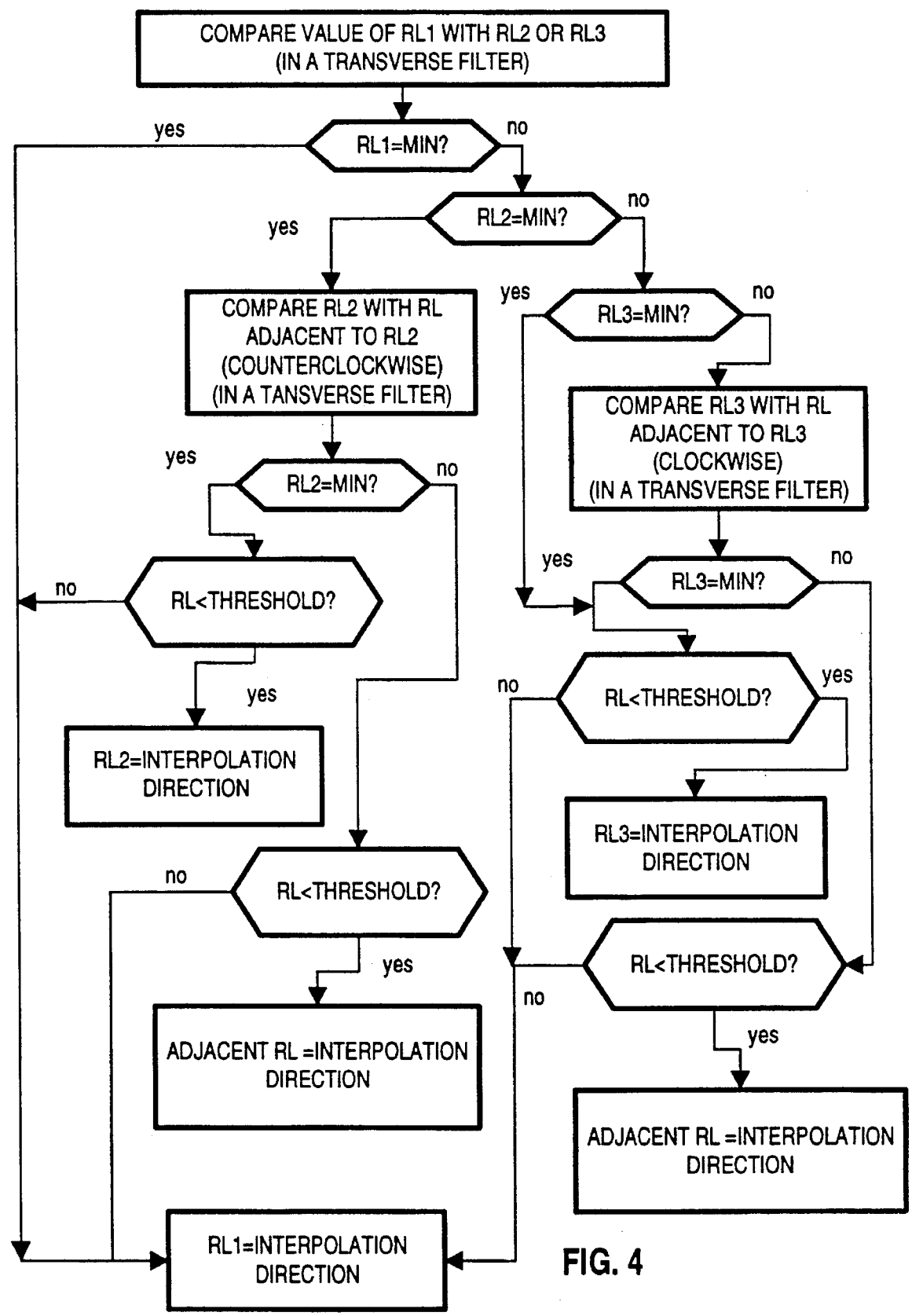
FIG. 4 is a flowchart of the inventive method.

In FIG. 3, the method of the invention of obtaining individual pixels BPN from the field format during the pixel raster conversion is illustrated with respect to a raster excerpt, and FIG. 4 shows a corresponding flowchart. Two lines Z1 and Z2 of pixels BP in field format are shown and between them a new line ZN of pixels BPN in to be generated. The present pixel X to be generated now no longer lies in the center between the lines Z1 and Z2 but is displaced in the direction of the vertical lines between two pixels BP of the two lines Z1 and Z2. This pixel X can nevertheless be generated by the method according to the invention. As already explained, interpolation lines denoted by LN1, LN2 and LN3 are projected through the pixel X at a specifiable angle α. The lines LN meet the lines Z1, Z2 in the field format but not at the pixels BP present therein. The respective intersection of the lines LN with the lines Z1 and Z2 are denoted by A, B and C on the line Z1 and F, E, D on the line Z2.

In order to determine the brightness value of the pixel X to be generated, the brightness value of the points A, B, C or F, E, D must first be determined since these points are not situated on the pixels BP. The minimum in the changes in the brightness value on the interpolation lines LN can then be determined in accordance with the method already explained, and the brightness value of the pixel X can be generated by interpolation after determining the direction having the minimum change in brightness value.

The determination of the brightness values of the pixels A, B, C is carried out by interpolation between adjacently situated pixels BP on the line Z1, on which the points A, B, C are situated. The same applies to the points F, E, D. The minimum in the changes in brightness value is then determined in the manner specified above and then the brightness value of the pixel X to be generated is determined by interpolation. The interpolation can be conducted using a transverse filter.

For the purpose of clarification, a coordinate network R-KC has been inserted in FIG. 3. In this diagram:

$d_x$=horizontal spacing of two pixels BP, $d_y$=vertical spacing of two pixels BP, $x_0, Y_0$=coordinates of the pixel X to be interpolated, α=angle of inclination of the interpolation direction, $x_1$=intersect of the interpolation lines LN2 with the upper line Z1, $x_2$=intersect of the interpolation line LN2 with the lower line Z2, $\lambda(0,0)$=brightness value of the pixel BP01, $\lambda(0,1)$=brightness value of the pixel BP02, $\lambda(1,0)$ and $\lambda(1,1)$=brightness values of the pixels BP10 and BP11, respectively.

If these variables are taken as starting point and, for example, the brightness values of the points B and E on the lines Z1 and Z2 are determined, this can be done in accordance with the following formula:

$$\lambda_B = (1-x_0')\lambda(0,0) + x_0'\lambda(0,1)$$

$$\lambda_E = (1-x_0')\lambda(1,0) + x_0'\lambda(1,1),$$

where $x_0' = x_0 \vee d_x$, i.e. a normalization of $x_0$ with respect to $d_x$ has been carried out. The brightness values λ of the points A to F can be determined in this way. It the brightness values of the points A to F are known, the line whose change in brightness value is a minimum can be selected for the individual interpolation lines LN. For this purpose, the following investigation is carried out:

$$D_0 = |\lambda_B - \lambda_E|$$

$$D_{-1} = |\lambda_A - \lambda_D|$$

$$D_1 = |\lambda_C - \lambda_F|$$

D denotes the changes in brightness values which are investigated for the minimum. If, for example, $D_0$, is a minimum, the interpolation line LN1 is selected. If $D_{-1}$ or $D_1$ is a minimum, new interpolation directions having a larger deviation from the vertical are investigated. If the change in brightness value in the new direction is greater than before, the previous interpolation line is selected, otherwise the step specified above is repeated with still greater deviation from the vertical. These steps are repeated until a minimum in the change in brightness value has been found. In practice, however, it is sufficient to terminate the iterations after not more than three to four steps. Assuming that the interpolation line LN2 is the one for which the change in brightness value between the points A and D is a minimum compared with adjacently situated interpolation lines, this direction is selected and the interpolation is carried out, in particular, in accordance with the following formula:

$$\lambda(x_0', y_0') = (1-y_0')\lambda_A + y_0'\lambda_D$$

where $$Y_0' = _{d_\lambda}{}^{y_0}$$

The method described therefore makes it possible to generate, starting from a specified pixel raster, any desired other pixel raster without a large expenditure being necessary for this purpose in terms of hardware.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for the format conversion of picture sequences present in a first pixel raster into a second pixel raster, in which the brightness values of the pixels in the second pixel raster are generated by interpolation from the pixels in a first line and in a second line of the first pixel raster adjacent to a pixel to be generated, comprising the steps of:

a) selecting a plurality of pairs of points, each pair of points having one point on said first line and one point on said second line, each pair of points being intersected by one of a plurality of intersection lines which all pass through a location of the pixel to be generated, at least one of said interpolation lines being perpendicular relative to said first and second lines;

b) determining a change in brightness between the pair of points intersected by the perpendicular interpolation line;

c) determining a change in brightness between respective pairs of points intersected by successive interpolation lines in two directions of rotation until the change in brightness value in the direction of one interpolation line is a minimum compared with the changes in brightness in the direction of adjacently situated interpolation lines; and d) generating the brightness value of the pixel to be generated by interpolating in the direction having the minimum change in brightness value only if the change in brightness value in the direction having the minimum in the change in brightness value is less than a predetermined threshold, and otherwise interpolating in the direction of said perpendicular interpolation line for the pixel to be generated.

2. A method according to claim 1 wherein step (c) is further defined by determining the respective changes in brightness value in a direction of rotation in which the change in brightness value becomes smaller.

3. A method according to claim 1, comprising the step of determining in the brightness values of the points on the lines of the first pixel raster if said points are not pixels, by interpolating the brightness values of adjacently situated pixels on a same line.

4. A method according to claim 1, wherein step (d) is further defined by interpolating between two brightness values of using transversal filters.

5. A method according to claim 1, wherein step (a) is further defined by obtaining said interpolation lines by rotation so that the interpolation lines are each spaced apart by the same angle.

6. A method according to claim 1, wherein step (a) is further defined by selecting said points to coincide with the pixels of the first line and the second line.

7. A method according to claim 1, wherein step (c) is further defined by locating said minimum in a 7×2 pixel window around the pixel to be generated.

8. A method for the format conversion of picture sequences present in a first pixel raster into a second pixel raster, in which the brightness values of the pixels in the second pixel raster are generated by interpolation from the pixels in a first line and in a second line of the first pixel raster adjacent to a pixel to be generated, comprising the steps of:

a) selecting a plurality of pairs of points, each pair of points having one point on said first line and one point on said second line, each pair of points being intersected by one of a plurality of intersection lines which all pass through a location of the pixel to be generated, at least one of said interpolation lines being perpendicular relative to said first and second lines;

b) determining a change in brightness between the pair of points intersected by the perpendicular interpolation line;

c) determining a change in brightness between respective pairs of points intersected by successive interpolation lines in two directions of rotation until the change in brightness value in the direction of one interpolation line is a minimum compared with the changes in brightness in the direction of adjacently situated interpolation lines;

d) generating the brightness value of the pixel to be generated by interpolating in the direction having the minimum change in brightness value; and e) determining the brightness values of the points on the lines of the first pixel raster, if said points are not pixels, by interpolating the brightness values of adjacently situated pixels on a same line.

9. A method for the format conversion of picture sequences present in a first pixel raster into a second pixel raster, in which the brightness values of the pixels in the second pixel raster are generated by interpolation from the pixels in a first line and in a second line of the first pixel raster adjacent to a pixel to be generated, comprising the steps of:

a) obtaining a plurality of interpolation lines by rotation around the pixel to be generated so that the interpolation lines are each spaced apart by the same angle;

b) selecting a plurality of pairs of points, each pair of points having one point on said first line and one point on said second line, each pair of points being intersected by one of said plurality of intersection lines which all pass through a location of the pixel to be generated, at least one of said interpolation lines being perpendicular relative to said first and second lines;

c) determining a change in brightness between the pair of points intersected by the perpendicular interpolation line;

d) determining a change in brightness between respective pairs of points intersected by successive interpolation lines in two directions of rotation until the change in brightness value in the direction of one interpolation line is a minimum compared with the changes in brightness in the direction of adjacently situated interpolation lines; and e) generating the brightness value of the pixel to be generated by interpolating in the direction having the minimum change in brightness value.

* * * * *